(12) United States Patent
Faber et al.

(10) Patent No.: US 9,897,720 B2
(45) Date of Patent: Feb. 20, 2018

(54) CONTAINER WITH DETECTION DEVICE FOR DETERMINING A STATUS OF THE CONTAINER AND MONITORING SYSTEM FOR DYNAMIC STATUS MONITORING WITH AT LEAST ONE SUCH CONTAINER

(75) Inventors: Albrecht Faber, Eggenfelden (DE); Franz-Josef Hoffman, Dayton, OH (US); Klaus Wittig, Ohringen/Kappel (DE)

(73) Assignee: Würth Elektronik ICS GmbH & Co. KG, Niedernhall (DE)

( * ) Notice: Subject to any disclaimer, the term of this patent is extended or adjusted under 35 U.S.C. 154(b) by 1174 days.

(21) Appl. No.: 13/816,508

(22) PCT Filed: Aug. 3, 2011

(86) PCT No.: PCT/EP2011/003894
§ 371 (c)(1),
(2), (4) Date: Aug. 29, 2013

(87) PCT Pub. No.: WO2012/019734
PCT Pub. Date: Feb. 16, 2012

(65) Prior Publication Data
US 2013/0335557 A1 Dec. 19, 2013

(30) Foreign Application Priority Data
Aug. 12, 2010 (DE) .................. 10 2010 034 176

(51) Int. Cl.
*H04N 7/18* (2006.01)
*G01V 8/10* (2006.01)
(Continued)

(52) U.S. Cl.
CPC .............. *G01V 8/10* (2013.01); *G01B 11/245* (2013.01); *G01F 23/292* (2013.01); *B65D 2203/10* (2013.01)

(58) Field of Classification Search
USPC ......................................... 348/143
See application file for complete search history.

(56) References Cited

U.S. PATENT DOCUMENTS 3,665,728 A * 5/1972 Stoller .................... F25D 3/107
62/320
3,851,970 A * 12/1974 Adler ...................... G01J 1/429
250/372
(Continued)

FOREIGN PATENT DOCUMENTS

DE 3632448 A1 4/1988
DE 19817995 C1 9/1999
(Continued)

*Primary Examiner* — Leron Beck

(57) ABSTRACT

A container for the transport and/or the storage of objects is described. A container of this type features a detection device for determining information on the occupancy status and/or the filling status of the container. The detection device is capable of detecting different light intensities in the region of the inner container wall and of generating corresponding sensor signals. Furthermore, an interface is provided for producing a connection with a signal processing unit, in which image information on the filling status and/or occupancy status of the container can be generated based on the sensor signals.

8 Claims, 6 Drawing Sheets

(51) Int. Cl.
*G01F 23/292* (2006.01)
*G01B 11/245* (2006.01)

(56) References Cited

U.S. PATENT DOCUMENTS

| | | | | |
|---|---|---|---|---|
| 4,708,409 | A * | 11/1987 | Voegeli | G09F 15/0043 312/138.1 |
| 5,579,409 | A * | 11/1996 | Vaidyanathan | G06K 9/00127 382/199 |
| 5,835,377 | A | 11/1998 | Bush | |
| 6,147,608 | A * | 11/2000 | Thacker | G08B 5/00 340/330 |
| 7,104,447 | B1 * | 9/2006 | Lopez | G07B 15/02 235/381 |
| 9,327,117 | B2 * | 5/2016 | Denison | A61N 1/36007 |
| 2001/0050116 | A1 * | 12/2001 | Skell | B67D 1/1236 141/351 |
| 2004/0000766 | A1 * | 1/2004 | Ekstein | B62B 3/004 280/47.34 |
| 2004/0139860 | A1 * | 7/2004 | Hamm | A47J 36/2433 99/275 |
| 2005/0274076 | A1 * | 12/2005 | Farhadi | A01G 9/16 47/66.6 |
| 2007/0022660 | A1 * | 2/2007 | Buitendag | A01G 27/06 47/81 |
| 2009/0223976 | A1 * | 9/2009 | Denis | F16K 1/306 220/565 |
| 2011/0095995 | A1 * | 4/2011 | Dassanayake | G06F 3/0425 345/173 |
| 2012/0035496 | A1 * | 2/2012 | Denison | A61B 5/053 600/547 |
| 2017/0152090 | A1 * | 6/2017 | Ours | B65D 71/0096 |

FOREIGN PATENT DOCUMENTS

| | | |
|---|---|---|
| DE | 102008027646 A1 | 12/2009 |
| DE | 102008060034 A1 | 7/2010 |
| EP | 0952432 A1 | 10/1999 |
| JP | 11312725 A | 11/1999 |
| WO | 2009138914 A2 | 11/2009 |

* cited by examiner

CONTAINER WITH DETECTION DEVICE FOR DETERMINING A STATUS OF THE CONTAINER AND MONITORING SYSTEM FOR DYNAMIC STATUS MONITORING WITH AT LEAST ONE SUCH CONTAINER

CROSS REFERENCE TO RELATED APPLICATIONS

The present application is a national stage entry according to 35 U.S.C. § 371 of PCT application No. PCT/EP2011/003894, filed Aug. 3, 2011 which claims the benefit of the filing date of German Patent Application No. DE 10 2010 034 176.2 filed on Aug. 12, 2010.

TECHNICAL FIELD

The present invention pertains to a container for the transport and/or the storage of objects, particularly piece goods and/or bulk materials, with a detection device for determining information on a container status, particularly the occupancy status and/or the filling status of the container.

BACKGROUND

Containers for the storage and transport of objects are used, for example, for storing or for transporting hardware such as screws, nuts or electronic components, i.e., generally piece goods, as well as bulk materials. Containers of this type can be used as transport containers, but also as storage containers in storage systems such as high-bay storage systems. A combined utilization would also be conceivable in that containers stored in a high-bay storage system are removed from this storage system and transported to a work site in order to serve as a decentralized storage location for a certain period of time.

With known containers, a significant effort is required for ensuring that a sufficient supply of the piece goods or the bulk material is on the hand in a storage system. This requires complex logistic systems that monitor the goods input, as well as the withdrawal from individual containers, particularly for monitoring the containers without interruption. In addition, the logistic system must know the original or initial filling status of each container. Inventories need to be regularly taken by manually counting all stored articles in order to ensure that errors, which inevitably occur over time, do not lead to supply problems. The effort for such inventories, as well as the effort for monitoring the input and the withdrawal of goods from the containers in the form of a logistic system, is labor-intensive and cost-intensive. Inventories furthermore carry the risk of human errors such as, e.g., miscounts. The monitoring of the input of goods into the containers and of the withdrawal from the containers is labor-intensive and requires a correspondingly complex and therefore expensive logistic system.

It was already proposed to weigh individual containers and to obtain information on the filling status of the respective container in this way. The disadvantage of such an embodiment is the dependence of the respective container on the scales because each container would require separate scales that are also subject to restrictions at the site of the container. It is furthermore required that the scales stand on an essentially level surface in order to weigh the container as accurately as possible. The scales are also a relatively complex structure that results in additional costs. A plurality of individual scales would be required, in particular, in high-bay storage systems that contain a variety of different products and, if applicable, a variety of partially different containers. The costs for such a system therefore increase linearly with the number of containers. Starting at a certain size, the utilization of weighing systems is no longer sensible in comparison with known logistic and inventory systems in terms of costs.

EP 0 952 432 A1 discloses a system for determining a material quantity in a container. For this purpose, infrared light sources and infrared light sensors are arranged behind opposing container side walls that are transparent to infrared light in such a way that the infrared light, which is emitted into the container by the infrared light sources and absorbed or reflected by material situated in the container, can be received by oppositely arranged infrared light sensors and makes it possible to determine the filling level of the container.

DE 10 2008 027 646 A1 discloses a system for automatically controlling, among other things, the goods input into automated small parts storage systems. For this purpose, images of articles to be stored and of the small parts containers or shelf boards are captured by cameras, stored and computationally processed, wherein information on the article to be stored such as the type of article to be stored and its dimensions and on the content of the small parts containers and/or shelf boards, as well as information on the occupancy and unoccupied areas of the small parts containers or shelf boards and their dimensions, can subsequently be extracted.

DE 36 32 448 A1 discloses a method for assembling different articles of an order in a computer-controlled fashion, wherein a transport device only advances a container from a storage position to the next predefined storage position once the correct quantity of the correct article has been placed into the container. This is achieved by determining the weight and/or with an optical control of the loaded container.

DE 10 2008 060 034 A1 discloses a storage system for storing objects with a frame structure and a storage unit that can be moved relative to the frame structure in a forward and backward moving direction and features a storage surface for storing at least one object thereon. Image data of the storage surface of the storage unit is acquired during its forward and/or during its backward motion relative to the frame structure by means of an image acquisition unit. An image analysis unit connected to the image acquisition unit generates a forward documentation image from forward motion image data acquired at at least one point during the forward motion and/or a backward documentation image from backward motion image data acquired at at least one point during the backward motion. An automatic identification of erroneous withdrawals is carried out with the aid of these documentation images in that emptied sections are identified and/or objects are identified in an image-based and/or database-based fashion.

SUMMARY

A potential objective of some embodiments of the present invention consists of respectively solving the above-described problems or improving known solutions. A potential objective of some embodiments of the present invention can be seen, in particular, in making available a container for the storage and/or transport of objects, on which information on the filling status and/or the occupancy status can be determined as cost-efficiently and as precisely as possible.

A first aspect pertains to a container for the transport and/or storage of objects. The container features a bottom and a side wall that jointly define an inner wall of the container. A detection device with an optical system and an integrated optical sensor is arranged on the side wall or integrated into the side wall. The detection device is designed for generating sensor signals concerning intensities of electromagnetic radiation, particularly light intensities, in the interior of the container. The container furthermore features a first interface that is functionally connected to the detection device and serves for transmitting the sensor signals to a signal processing unit with a function for generating image information based on the sensor signals in order to determine information on an occupancy and/or filling status of the container.

Such a container therefore utilizes the physical phenomena of optics in order to determine information on the filling status and/or the occupancy status of the container. In this case, the detection device may be realized integrally with the side wall or arranged thereon. The detection device may be arranged on the side wall separably, as well as inseparably. In a special embodiment, the detection device may be realized integrally with the side wall such that the entire container has the most compact design possible.

In order to equip already existing container systems for the transport and/or storage of objects in accordance with the presently proposed concept, the detection device may have to be separably arranged on or in the side wall, for example, by means of a snap-lock connection such that the container can be initially equipped and/or retrofitted with a detection device.

In certain embodiments, the detection device can generate sensor signals concerning or in accordance with intensities of certain electromagnetic radiation such as, for example, electromagnetic radiation in the visible range, i.e., light intensities, in or from the interior of the container. In the context of the invention, this also includes electromagnetic radiation in the ultraviolet range and/or the infrared range. With respect to electromagnetic radiation in the visible range, the light intensities in the interior of the container may, for example, be light intensities that differ with respect to the tristimulus value and/or the brightness value of the light from the interior of the container. In other words, light intensities such as, for example, differences in brightness values and/or differences in tristimulus values within the interior of the container can be respectively perceived or detected by means of the detection device. The detection device exclusively serves for generating the sensor signals in dependence on the detected intensities or light intensities in this case. An analysis, for example, for determining the occupancy status and/or filling status of the container may then be carried out separately of the detection device.

Generated sensor signals can be transmitted to a signal processing unit via the first interface of the detection device. This interface may be realized in a wire-bound fashion, i.e., mechanically, as well as in the form of a wireless air interface such as, for example, a Bluetooth interface, a Wireless-LAN (WLAN) interface or another type of air interface for transmitting data.

The signal processing unit obtains or receives the generated sensor signals from the detection device and is designed for generating image information for determining the occupancy status and/or filling status of the container from the received sensor signals. In other words, the image information is generated from the sensor signals of the detection device in the signal processing unit. This image information contains the information used for determining the occupancy status and/or filling status of the container, but this information is not yet analyzed. In other words, the detected sensor signals are already specific to the filling status and/or the occupancy status of the container.

It should be noted that the further processing of the generated sensor signals into image information does not necessarily have to take place on the container. It is also possible to provide a container with an interface for the transmission of the sensor signals to an external signal processing unit. This makes it possible to realize decentralized systems, in which the signal processing does not take place directly on the container. The utilization of one signal processing unit for several containers therefore would also be conceivable.

The detection device of the container may feature at least one camera with an optical system. In a particularly simple embodiment, the optical system may consist of a single pin diaphragm. The optical system may alternatively feature at least one lens in front or behind a diaphragm or only a lens or several lenses, i.e., no diaphragm. The optical sensor is conventionally arranged in an image plane of the optical system. In other words, it is possible to realize two basic arrangements. The optical system may basically feature only a single pin diaphragm. Alternatively, the optical system may feature a lens system with one or more lenses that also contains a diaphragm, as well as (at least) one additional lens (in front or behind the diaphragm) that produces a regular optical image.

The system projects the intensities of electromagnetic radiation from the interior of the container on the image plane, in which the optical sensor is arranged. In this case, it may suffice to constantly adjust the depth of field of the optical system to the inside dimensions of the container or a corresponding depth of field is sufficient for determining the filling status and/or occupancy status.

An optical detection device of this type is able to generate a plurality of sensor signals in dependence on the detected intensities or light intensities, respectively. Depending on the type of camera, sensor signals that are resolved to a different degree, i.e., a different number of sensor signals referred to an equally large surface area of the inner container wall, may be present. It is also possible that the individual sensor signals have different qualities. Such a camera may produce black-and-white images in the form of different brightness values. However, it would also be possible that the optical sensor consists of a color sensor that is able to perceive color differences of the received light intensities in the interior of the container.

Since the optical sensor is arranged in the image plane of the optical system such as, e.g., at least one lens and/or one diaphragm and a movable lens or a movable sensor is provided, the optical system can be focused on the interior of the monitored container.

It is possible, in particular, to make available an optical system that consists of at least one lens and/or one diaphragm and the optical sensor and may be based on standard optical components, e.g. sensors. The overall costs for such a container can be reduced due to the focusing by means of a lens and/or a diaphragm, as well as the utilization of a cost-efficient optical sensor.

The detection device in the form of a camera does not have to consist of a complex camera of the type used for producing moving images (film sequences) or high-resolution photographs. The term "camera" rather refers to the detection device, particularly an optical sensor installed therein, being able to capture at least still images with a plurality of pixels, wherein information on the light intensity in the form of a sensor signal can be generated for each pixel. The detection device in the form of a camera therefore may simply produce a plurality of low-resolution pixels that have different brightness values, i.e., a low-resolution black-and-white image in the simplest case.

If a camera is utilized in the detection device, it is possible to provide more than a single camera on or in the container. It would be possible, in particular, to arrange several cameras on and/or in the inner wall of a container such that they are spaced apart from one another. Perspective images, particularly three-dimensional images, can be produced in this way, i.e., stereography can be realized. The analysis of such stereographic images takes into account the arrangement of the at least two cameras relative to one another in the side wall or the bottom of the container and allows a three-dimensional analysis of the interior of the container. In this way, the production of such stereographic images makes it possible to obtain even more accurate information on the filling status and/or the occupancy status of the container.

Information on or about the "filling status" may not only refer to the actual filling quantity, i.e., the remaining quantity in a container. Information associated therewith such as in the simplest case the information "full" and the information "empty" may suffice as information on the filling status. The required resolution of the information on the filling status depends on the respective application or objective. Depending on the type and the design of the detection device, other information may also be generated by the detection device in addition to this basic information on the filling status.

Information on or about the "occupancy status" may refer, for example, to information on the type of occupancy, i.e., the accommodated utensils, components or piece goods or even bulk materials. In this case, it is naturally also possible that the optical detection device transmits different types of sensor signals. For example, it would be conceivable that different sensor signals of the detection device in the form of a combination of tristimulus values and light values are transmitted to the signal processing unit. This signal processing unit is able to perceive the different sensor signals as different signal groups and to analyze the sensor signals accordingly. Consequently, it would also be conceivable to use optical sensors that are arranged at different distances from a lens and therefore can be activated differently by varying the position of the image plane of the lens. For example, different sensor signals of different signal groups can be generated within a single optical sensor by varying the lens focus, i.e., the image plane of the lens. In such a particularly cost-efficient embodiment, complex monitoring of not only the filling status, but also of the occupancy status of the container is achieved in a cost-efficient fashion.

The signal processing unit may furthermore feature a second interface for transmitting the image information to an analyzing unit in order to determine the occupancy status and/or filling status of the container. In this way, an automated analysis of the image information and therefore an automated generation of information with respect to the occupancy status and/or filling status of the container can be realized in an internal or alternatively external analyzing unit referred to the container.

The difference between occupancy status and filling status is in this context defined as follows. The "filling status" refers to the degree, to which the container is filled. In this case, the gradations of the gradual filling degree can be optionally adapted depending on the respective application. For example, the detection device may merely distinguish between an empty container and a filled container, i.e., only two filling statuses exist. However, a finer graduation of the filling statuses would also be conceivable if the detection device has a higher resolution. It would be possible, in particular, that the detection device reproduces the filling status with particularly high resolution and therefore is able to describe the course of the filling status over time.

In this context, "occupancy status" refers to the fact that not only the filling status, but also the type of occupancy of the container can be monitored additionally or alternatively to this filling status. In such an embodiment, the detection device serves for determining the type of stored components or the type of stored piece goods in the form of occupancy status information. This can be realized, for example, by analyzing the contour lines of the stored objects that are determined by means of the sensor signals and the image information.

In addition to merely making available image information that in a semi-manual process can also be monitored, for example, by maintenance personnel, the second interface for transmitting the image information to the analyzing unit also serves for the further automation of a logistic process for containers of this type. This makes it possible to reduce the costs for carrying out the logistic process, particularly for monitoring the occupancy status and/or the filling status of a plurality of such containers.

Furthermore, a container module for being initially installed or retrofitted on a container according to Claim 16 is proposed. Such a module makes it possible to initially equip or retrofit a container with an above-described detection device and a signal processing unit. With respect to its shape, the container module is realized in such a way, for example, that it can be integrated into or arranged on a side wall of the container. Such a container module therefore features the detection device with the optical system and the integrated optical sensor, wherein the detection device is designed for generating sensor signals in accordance with intensities of electromagnetic radiation, particularly light intensities, in the interior of the container. In addition, the container module also features the signal processing unit with a function for generating image information based on the sensor signals in order to determine an occupancy status and/or filling status of the container. The signal processing unit is functionally connected to the detection device via the first interface for transmitting the sensor signals to the signal processing unit.

In addition, the container module may also feature a suitable energy supply. This energy supply may consist, for example, of a battery compartment with suitably dimensioned batteries. In this context, suitably dimensioned means that a certain battery capacity is provided that suffices for reliably operating the battery module in an autarkic fashion for a predetermined period of time based on a known utilization profile and therefore an assessable power demand.

An analyzing unit that is functionally connected to the detection device may be provided within the scope of the presently proposed container. This analyzing unit is connected to the signal processing unit via the corresponding second interface and capable of or designed for determining the occupancy status and/or the filling status of the container based on the received image information. The analyzing unit may be arranged directly on the container, particularly adjacent to the detection device and/or signal processing unit, and functionally connected to the second interface, particularly in a wire-bound fashion. The analyzing unit may be alternatively arranged separately of the container and functionally connected to the second interface, particularly in an at least sectionally wireless fashion, e.g., by means of a radio link.

In embodiments, in which the analyzing unit forms part of the container, i.e., is arranged thereon or therein, the container represents a compact unit that not only can fulfill its basic function of storing and transporting objects, but also monitor the occupancy status or filling status in an automated and completely autarkic fashion. In this way, the containers can be arbitrarily combined into a plurality of containers in a storage system or high-bay storage system and no limitation exists with respect to a central analyzing unit. In this case, the detection device, as well as the signal processing unit or the analyzing unit, may individually or jointly feature interfaces that are connected to a central computer, i.e., a central control unit or control of the overall logistic process.

In embodiments, in which an external analyzing unit referred to the container is used, i.e., arranged outside of the individual container, one analyzing unit can centrally monitor the respective occupancy status or filling status of a plurality of containers. This likewise makes it possible to utilize a plurality of containers that are monitored by one or more central analyzing unit(s) in a storage system or high-bay storage system.

The analysis of the image information made available by the signal processing unit may take place in the analyzing unit. However, it is also possible to carry out the analysis or the interpretation of the occupancy statuses or filling statuses of a container, particularly of a plurality of containers, that were determined by means of the analysis at a central location of a monitoring system. Consequently, a central control unit or control can communicate with a plurality of containers or analyzing units and therefore receive occupancy statuses and filling statuses of a plurality of containers that were determined by the analyzing units. In other words, the analysis of the image information may be carried out in a central analyzing unit of an overall system. The determination of the individual occupancy statuses or filling statuses of a container, particularly of a plurality of containers, is in other words carried out at a central location in this case. Consequently, a central control unit or control communicates with a likewise centrally arranged analyzing unit and receives the determined occupancy statuses and filling statuses of the plurality of containers of the overall system from this analyzing unit. The analyzing unit therefore may also be implemented in the form of a software application of the central control unit or control of the overall system.

In this way, it is not only possible to monitor and therefore control the filling status or occupancy status of individual containers by reordering the respective goods in a timely fashion, but also to incorporate the correlation between different filling statuses such as, for example, the correlation between stored utensils that depend on one another or can substitute one another into the logistic process for the transport and/or the storage of the objects. The entire logistic process can be carried out even more efficiently in this way.

In certain embodiments, the analyzing unit is designed in such a way that image points in the form of projection points of contour points of objects situated in the container are determined during the analysis of the image information. At least one contour line can be determined based on the determined contour points and information on the occupancy status and/or filling status of the container can be determined from this contour line. In other words, the analyzing unit analyzes the image information point-by-point. Individual image points are defined as projection points of contour points during this process. These projection points can be detected in the analyzing unit, for example, based on abrupt changes in the tristimulus values and/or the brightness values from one point to the next point. If an inner container wall has a continuous color or the inner container wall has a continuous brightness, such abrupt changes represent a discontinuity in the surface structure that can be caused, for example, by the transition between inner container wall and object. If the detection device is designed for monitoring the interior two-dimensionally, the contour points and the projection points coincide in the two-dimensional image that is generated as image information in the signal processing unit based on the sensor signals.

In embodiments, in which the detection device features more than one camera and is capable of converting stereographic sensor signals into three-dimensional image information by means of corresponding signal processing, it is possible that the projection points and the contour points do not coincide in the image information. Based on the plurality of projection points of the three-dimensional image information, the analyzing unit is in this case able to determine a plurality of contour points that differ from said projection points and have a three-dimensional position in space that can also be determined. In three-dimensional image information, the contour points can then be determined in the form of a contour surface such as, for example, an envelope or surface area of an object by means of the detection device in the analyzing unit.

Such an embodiment makes it possible to draw conclusions with respect to the detected shape of one or more objects. The detection of the shape of objects by either detecting a projection cross section as a contour cross section or detecting a contour surface in three-dimensional space makes it possible to approximately or positively determine the type of objects. In other words, it is possible to approximate the respective type of object, i.e., the stored utensils or piece goods. This in turn makes it possible to detect the filling status or alternatively also the occupancy status, i.e., the type of stored goods.

The analyzing unit may also be designed in such a way that it identifies locations or areas with tristimulus values or brightness values that lie within or outside of a predefined value range in the image information. Subsequently, information on the occupancy status and/or filling status of the container is determined based on a number of these locations or areas with tristimulus values or brightness values that lie within or outside of a predefined value range. In other words, locations or areas that lie within or outside of a predefined value range with respect to their tristimulus values and/or brightness values can be added. The total is compared, in particular, with previously stored totals, for example, of the overall inner surface of the container wall and makes it possible to generate initial approximate values for the filling status and/or also the occupancy status of the container.

For example, it is possible to analyze all areas or locations that lie in the region of a special color, for example the color of the inner container wall, or have a special brightness such as, for example, a very high brightness value because particularly reflective surfaces of objects are present. If the locations or areas with such tristimulus values or brightness values are added, it is possible to carry out a comparison with the overall surface of the inner container wall and therefore to ascertain the relation of the determined areas with corresponding tristimulus values or brightness values to the overall surface. In other words, it is therefore possible to determine the proportion, for example, of a projection cross section of objects that covers sections of the overall surface of the inner container wall. This is a special method that requires very little computing effort in the analyzing unit. However, it is still possible to obtain a relatively precise overview of the filling status of the container. In this case, it is irrelevant whether the detection device of such an embodiment carries out three-dimensional or merely two-dimensional monitoring. In a first step, it rather suffices if the detection device carries out the described surface area comparison and in this way determines a first approximation for the occupancy status or the filling status of the container.

The predefined value range may correspond to tristimulus values and/or brightness values of the light reflected by the inner container wall. A relatively narrow range of tristimulus values and/or brightness values can be defined and assigned to a visible inner container wall, in particular, if the surface of an inner container wall has a special design due to the choice of a particular color or the choice of a particular surface coating or surface processing and therefore improved reflection. This value range can be chosen such that it significantly differs from the measured tristimulus values and/or brightness values of the objects received by the detection device.

It would naturally also be possible that the predefined value range of tristimulus values and/or brightness values corresponds to a light emission that takes place on the inner container wall. In other words, an active inner container wall that is active at least in sections thereof, i.e., capable of sectionally emitting light, is provided in such an instance. The container in other words consists of an internally luminous container that emits light outward.

It would also be conceivable that the inner wall of the container is at least sectionally made of luminescent material. In this case, the luminescence can be achieved in different ways. For example, chemoluminescence makes it possible to illuminate the interior of the container by means of a chemical reaction. It would also be conceivable to use luminescence that is stimulated, for example, by UV radiation, X-ray radiation, radioactive radiation, electron radiation, ion radiation or even sound waves. Mechanical processes (e.g., riboluminescence) could conceivably also be used, for example, when objects in a container are moved and the friction between the object and the inner container wall mechanically influences the surface of the inner container wall in such a way that luminescence results.

In a certain embodiment, the analyzing unit is designed for detecting regular structures and/or patterns in or on the bottom and/or the side wall that form the inner container wall, as well as for determining information on the occupancy status and/or filling status of the container based on the degree, to which the regular structures and/or patterns are covered. This means that the container is accordingly provided with these regular structures and/or patterns, for example a grid, on the bottom and/or the side wall. For example, the inner container wall respectively may be at least sectionally or solely sectionally adapted to the corresponding predefined value ranges of tristimulus values and/or brightness values. These sections may be realized in the form of locations or areas with a defined geometric shape, i.e., in the form of a regular structure and/or pattern. Such locations or areas may be arranged in the form of lines or gratings such that, for example, a grid is realized in this way. Information on the occupancy status and/or filling status of the container can be determined based on the degree, to which the regular structure and/or pattern in the form of a grid is covered.

If such a grid is provided, it is also possible to correlate the detectable grid points with additional known information on the actual positioning of the grid in the analyzing unit. If the grid position of the inner container wall is specified as parameter in the analyzing unit, it is possible, for example, to determine the exact position of the respective object based on the detected actual situation on an inner container wall, i.e., the detected locations and areas, in which the corresponding grid is visible. In this way, it is also possible to obtain three-dimensional information from a two-dimensional detection device as long as the grid is with respect to the two-dimensional perception distributed in the inner container wall in such a way that conclusions with respect to the three-dimensional position of the corresponding grid can be drawn. For example, an angular arrangement of the individual grid lines relative to one another makes it possible to obtain information on the perspective of the detection device. The height of objects can also be determined if the detection device is able to distinguish between the grid on the side walls of the container and the grid on the container bottom.

The container can be enhanced by realizing the analyzing unit in such a way that it identifies in the image information locations or areas, the tristimulus value and/or brightness value of which deviates from a predefined value by a minimum amount, and subsequently determines information on the occupancy status and/or the filling status of the container based on the number of these locations or areas. In contrast to the preceding method, a value range, within or outside of which the measured values lie, is not predefined in this case, but a defined individual value is rather specified and a minimum deviation from this value is defined. In this case, the value may be specified centrally, i.e., such that the minimum amount above and below the specified value is accepted as deviation, or in the form of a maximum value. In this case, the minimum amount may correspond to a value that lies above the tolerance of the detection device with respect to the measured tristimulus value and/or brightness value. In this way, the detection device is provided with a higher resolution with respect to the detected light intensity than the resolution used by the analyzing unit with respect to the minimum amount of the deviation of the tristimulus value and/or the brightness value from a predefined value. In other words, the detection device is more accurate with respect to the detection than required for the analyzing tolerance in the analyzing unit.

Such an embodiment may also be enhanced as explicitly described above with reference to the reflection of light on the inner wall of the container, the generation of light on the inner wall of the container or the luminescence in sections in the entire inner container wall, as well as with reference to the realization of a grid.

The tristimulus values and/or brightness values used for the occupancy status and/or filling status of the container can be assigned to pixels of the image information received by the analyzing unit. The pixels of the image information received by the analyzing unit are arranged, in particular, in a matrix-like fashion, i.e., in the form of a grid, the individual grid lines of which essentially extend perpendicular to one another. The positioning of the individual pixels relative to one another therefore is defined in can be used for describing the relative relationship between the individual points in reality, i.e., within the interior of the container. If the analyzing unit is informed about the generation of the image information in the signal processing unit, i.e., if it has information on the type of detection device and the resolution of the detection device with respect to the image information from the signal processing unit, it can draw conclusions regarding the actual positioning of the respective pixels in the interior of the container from this information in connection with the received image information. In this way, it is possible to determine an orientation and also a positioning of the perceived object, particularly of the determined contour points or projection points, in reality, i.e., in the interior of the container. Consequently, the individual pixels with the same tristimulus value or the same brightness value can be added. In other words, the individual pixels form locations or areas of the type already described above with reference to the two variations.

The analyzing unit of a container may furthermore be realized in such a way that at least two different groups of areas or locations determined with respect to at least one area of tristimulus values or brightness values or at least one predefined tristimulus value and/or brightness value are identified in the image information. Information on the occupancy status and/or filling status of the container can then be determined based on the respective number of areas or locations in the two different groups. In contrast to the above-described method, not only a single selection is made in this case, but rather at least two selections. In this way, two different groups that correspond to two different areas of tristimulus values and/or brightness values are selected. For example, it is not only possible to define the inner container wall is an area for such a group, but to furthermore also identify an object for such a group. Even if a plurality of different objects are jointly stored in a single container, tristimulus values and/or brightness values can still be assigned to different groups due to different types of reflection. In this way, a comprehensive information image is provided such that particularly the storage or prior input of information is not required. In other words, the visible inner container wall and likewise the visible objects are measured and can be interrelated in the analyzing unit. Consequently, this makes it possible to carry out a comparison between the individual groups with respect to their number of areas and locations without carrying out a comparison with the previously stored overall surface of the container interior, i.e., the overall surface of the inner container wall. The flexibility of such a device therefore is increased many times over.

The container may furthermore be realized such that the inner container wall is adapted to the detection device in such a way that the difference between the tristimulus values and/or brightness values detected by the detection device for the inner container wall and the tristimulus values and/or brightness values detected by the detection device for objects lies above a predefined detection threshold value. This means that the bottom and the side wall that form the inner container wall can be adapted to the detection device in such a way that the tristimulus values and/or brightness values detected by the detection device for the inner container wall differ from the tristimulus values and/or brightness values detected by the detection device for objects in the container by a predefined detection threshold value.

In other words, this makes it possible to increase the contrast for the detection device by adapting the inner container wall. For example, a corresponding color or a corresponding surface structure of the inner container wall makes it possible to respectively achieve a color or a brightness that significantly differs from the color or the brightness of the objects with respect to the reflection or emission of light on the inner container wall. For example, if objects with the dominant color red should be stored within a container, it is possible to increase the contrast by designing the inner container wall with a complementary color. For objects with a particularly high reflectance, the inner container wall can be realized in a largely dull fashion in order to achieve the highest contract possible with respect to the brightness values for the detection device.

In addition to processing the surfaces with respect to their color, roughness value, reflection characteristics, etc., the inner container wall, particularly the side wall, may be at least sectionally coated with a film that essentially cannot even be perceived by the optical detection device. For example, it would be possible to provide films that suppress the reflection of light to such a degree that hardly any light is reflected. In such an embodiment, the detection device therefore is able to perceive only very low tristimulus values and/or brightness values or no tristimulus values and/or brightness values at all in the region of the film. Accordingly, automatic filtering is realized in this case without an additional optical filter in the detection device, but rather by means of a corresponding design of the inner container wall only.

The optical system may feature a filter, by means of which the detection device filters out locations or areas with predetermined tristimulus values and/or brightness values for the analyzing unit. This means that the optical system may feature at least one filter that is designed such that the detection device can only detect electromagnetic radiation from a frequency range that is defined in such a way that only locations or areas of the bottom and/or the inner container wall with predetermined tristimulus values and/or brightness values are detected for the analyzing unit. For this purpose, the analyzing unit may feature a function that determines information on the occupancy status or filling status of the container from a number of locations or areas that are not filtered out.

In this embodiment, active optical filtering is carried out by means of the detection device. This is advantageous, for example, in instances, in which an adaptation of the inner wall of the container would be complex or costly. For example, such a filter may have a contrast-increasing effect and filter out areas with special tristimulus values or special brightness values. Consequently, the filter can be used, for example, for completely filtering out the background color of the inner container wall such that only the objects are perceived by the detection device. The analysis in the analyzing unit may in this case be carried out as explicitly described above and include, for example, a comparison with the previously stored overall surface of the inner container wall. In this way, the computing effort in the analyzing unit is reduced many times over because it is merely required to add the non-filtered locations and areas and to subsequently carry out a comparison with a stored surface. The filter may consist of an optical filter that is designed for filtering out certain wavelengths or even certain wave directions, i.e., the polarization of the received light for the detection device.

The container may be enhanced in such a way that it features a power supply module that is connected to the detection device by means of an electric supply line. In order to activate the power supply module, the container may feature an activation device that is functionally connected to the power supply module and, if applicable, to the analyzing unit and makes it possible to activate the power supply module and, if applicable, the analyzing unit for a detection and analysis period. The container therefore is even more autarkic of possibly surrounding systems. In this way, particularly the energy supply of the analyzing unit can be ensured in a decentralized fashion. The activation device of the analyzing unit may be active, as well as passive. Active and, in particular, intelligent activation devices may be realized, for example, in the form of a graphical user interface or also in the form of mechanical interfaces such as buttons or knobs that switch the detection and analysis on and off.

It would also be conceivable to utilize simpler and much more cost-efficient passive embodiments of the activation device. In a special instance, it would be possible, for example, to provide a tamper-evident device that in the form of an activation device produces the electric contact between the power supply module and the analyzing unit when it is removed, for example pulled out or stripped off. In this way, a passive activation of the analyzing unit is carried out for a detection and analysis period. This detection and analysis period can be concluded actively, as well as passively, as soon as the power supply module, for example, in the form of a depleting battery has lost its required voltage.

Other activation options with sensors that measure, for example, the brightness of the surroundings would also be conceivable. It can occur, for example, that a logistic process should only be carried out during the night. In order to ensure that the continuously occurring depletion and replenishment of a container during the day does not interfere with the logistic process, it can be ensured, for example, with the aid of a light sensor that the analysis or even the entire process of the detection, the signal processing and the subsequent analysis is only carried out during the night, i.e., in situations, in which the light level of the surroundings is reduced. However, in applications, in which detection devices are used that depend on light from external light sources such as, for example, cameras that with respect to their resolution and image quality are dependent on ambient light, the activation device could feature an interface with an external light source such that this external light source can be activated in a time period, in which the power supply module and the analyzing unit are activated. This external light source therefore also makes it possible to carry out measurements with an optical detection device in dark situations such as, for example, during the night.

A second aspect pertains to a monitoring system for presence detection and/or filling level monitoring and/or occupancy monitoring with at least one container according to the first aspect and a receiver that is realized separately of the container and features an analyzing unit that is connected to the signal processing unit and/or the detection device via the respective interface for receiving the image information and/or the sensor signals. The monitoring system may be designed, in particular, for ascertaining the current location and/or the presence of a certain container at a certain location.

Such a monitoring system therefore is a centralized system using at least one container. In this way, it is not only possible to carry out the logistic process, i.e., the monitoring of withdrawals from the containers and of the replenishments of the containers, in a decentralized fashion, but also to carry out the analysis of the image information to be transmitted in a central step in a single analyzing unit for one or more containers. In this case, the receiver may be designed for the reception of data, i.e., for the reception of the image information and/or the sensor signals, via radio signals or via a cable. With respect to radio signals, for example, Wireless LAN, Bluetooth or other radio systems may be considered.

It is furthermore possible to assign a position specification or a container numeration that forms part of the sensor signals and/or the image information forwarded to the signal processing unit and/or the image information forwarded to the analyzing unit to each container, for example, in the detection device and/or the signal processing unit. In this way, the individual sensor signals and/or the individual image information is distinctly addressed to the container of origin. Consequently, a plurality of containers with a plurality of detection devices can also be processed in a single analyzing unit because the origin of the corresponding data can be ascertained in any situation.

The monitoring system may feature the analyzing unit that, in particular, is arranged centrally and determines a specific filling level value for the filling level situation or occupancy situation of the respective container. In this case, a specific filling level value does not necessarily have to correlate with the actual situation such as, for example, the weight or the number of objects accommodated in a container. In a particularly simple instance, it may in fact suffice if the determined filling level value amounts to 0 or 1, i.e., is interpreted in the form of "full container" or "empty container." Consequently, a container is interpreted as being "full" as long as it is sufficiently filled, i.e., as long as the filling level lies above a filling level limit to be detected. If the filling level of the container falls short of this limit, the determined filling level value is set to 0, i.e., to a value that appears excessively low with respect to the required stock keeping. Higher resolutions such as, for example, "empty," "half-full" and "full" up to essentially continuous monitoring of the filling level would also be conceivable for the determination of the filling level value.

BRIEF DESCRIPTION OF THE DRAWINGS

The present invention is described in greater detail below with reference to the drawings. The concepts "left," "right," "top" and "bottom" used in this description refer to an orientation of the drawings with normally legible reference symbols. In these drawings:

FIG. 3 shows a schematic cross-sectional representation of an example of a detection device.

DETAILED DESCRIPTION

Figure 1:
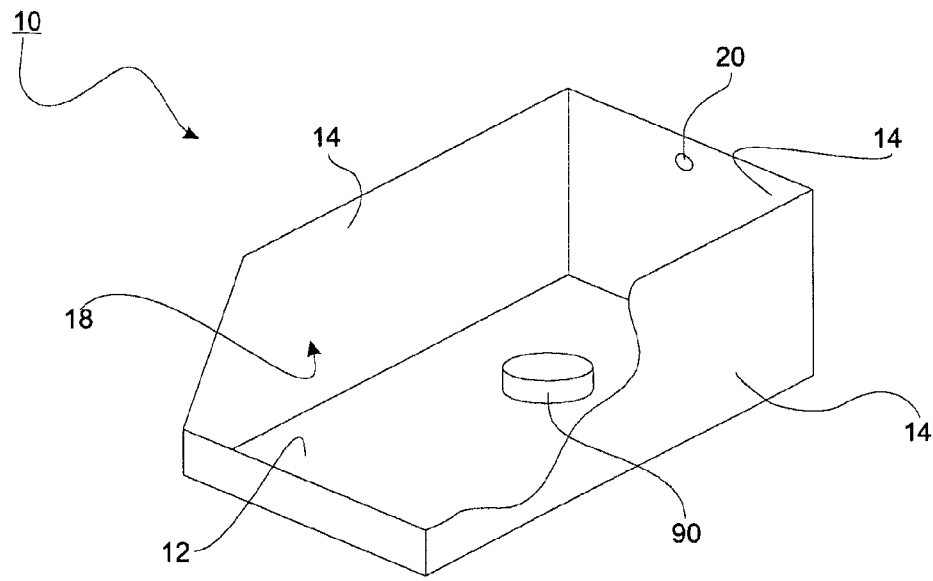
FIG. 1 shows an isometric representation of an embodiment of a container with a detection device.

Example embodiments of the invention make available a container for the transport and/or for the storage of objects, particularly of piece goods and/or bulk materials, that features means such as, for example, a detection device for determining the occupancy status and/or the filling status of the container.

A suitable container type is realized, for example, rectangularly, has a bottom and a side wall consisting of four equally high container walls and is open on top. The container may be provided with a hinged lid on or in the side wall, e.g. in a container wall that forms a front side of the container. The container material may consist of a plastic such as, e.g., black plastic with a relatively smooth surface texture.

The inner container wall of essentially uniform height and the bottom of the container from a simply connected 3-dimensional surface that represents the spatial boundary surface for all objects or articles situated in the container, as well as a boundary surface for all electromagnetic phenomena, for example optical phenomena, within the container. Due to Earth's gravity, this 3-dimensional surface ensures that the content of the container remains unchanged over time if the container is suitably positioned, i.e., sufficiently horizontal, and no human intervention occurs.

A monitoring or determination of the container content may essentially be based on the following approach: looking into the container, estimating the identity and quantity of the contents and, if so required, analyzing the filling level more accurately or counting all objects present in the container.

For this purpose, the ratio between the visible container wall surface (and of the visible bottom surface if the container is nearly empty) in relation to the complete 3-dimensional structure of the container can be determined, for example, with a monitoring device and the still remaining quantity, i.e., the actual filling level of the container, can then be estimated based on the complementary volume.

If a container is almost empty, an additional quantitative measure can be taken, by means of which the number of still remaining objects is exactly counted because the relative miscount becomes more and more important as the number of objects decreases.

This means that the detection of the container content is based on information on the respective detectable and undetectable inner container surfaces in combination with the contents. For this purpose, a sufficiently accurate 3-dimensional model of the inner container surfaces and the container geometry is generated for the determination of the occupied volume and the number of objects in the container can then be estimated based on the average volume occupied by one individual object.

In order to improve the analysis with respect to reproducibility, the inner surfaces of the container walls and of the container bottom may be realized with properties that can be actively or passively detected by the detection device in a sufficiently accurate fashion. For this purpose, it is possible to detect the surface properties of the container bottom and the inner container wall in a three-dimensionally resolved fashion and to subsequently carry out a true-to-scale comparison with the 3-dimensional container model. It is preferred to only analyze surface properties that are largely independent of locally variable ambient conditions (environmental influences) at the respective location of the container. The information concerning the inner container wall ultimately can be neglected as soon as the number of components situated in the container is so small that only the bottom surface is entirely or partially covered.

In the example embodiment described below with reference to the figures, the means for determining the occupancy status and/or the filling status of the container is integrated into the side wall of the container or arranged thereon. It consists of a detection device in the form of a three-dimensionally resolving sensor system that is located at one or more suitable points on or within the container.

A suitable sensor system is characterized in that it is capable of detecting the inner container wall in a complete or collectively complete fashion. For example, the described example embodiment of the container is equipped with a detection device that can generate sensor signals concerning light intensities in the interior of the container by means of an optical system and an integrated optical sensor.

FIG. 1 shows a first embodiment of a container 10. This container is illustrated in the form of a slightly cut-out isometric representation such that nearly the entire bottom 12 of the container 10 is visible. The bottom 12 forms the inner container wall 18 together with the side wall 14. Objects 90 can be accommodated in the region of the inner container wall 18, i.e., in the interior of the container 10. The container 10 therefore consists of a container for storing or for transporting objects 90 accommodated therein.

The container 10 according to the embodiment illustrated in FIG. 1 features a detection device 20. This detection device 20 is integrated into the inner container wall 18, particularly into the side wall 14. In this case, the detection device 20 is arranged on the rear side wall 14 of the container 10 referred to the orientation thereof. From this location, the detection device 20 can respectively monitor or perceive the entire interior of the container, i.e., the entire inner container wall 18.

The detection device 20 is capable of generating sensor signals that depend on the light intensities in the interior of the container, i.e., on the inner container wall 18. The detection device 20 therefore perceives different light intensities such as, for example, different tristimulus values or different brightness values in the interior of the container 10. If an object 90 is situated in the container 10, it covers sections of the inner container wall 18 referred to the detecting direction of the detection device 20.

In FIG. 1, a section of the bottom 12 is covered by the object 90. This coverage results in different light intensities that are perceived by the detection device 20. If the detection device 20 is based on the detection of reflected light from the interior of the container 10, the objects 90 within the container 10 have different reflection characteristics than the inner container wall 18, i.e., the bottom 12 and the side wall 14. In the section of the bottom 12 that is covered by the object 90, the detection device 20 therefore detects different light intensities than in sections of the bottom 12 that are not covered by objects 90 and in which light reflected by the bottom 12 or the side walls 14 can be directly detected. The different detection of the different light intensities results in the generation of correspondingly different sensor signals by the detection device 20. These differences serve for determining the filling level and/or the occupancy status within the container 10.

The sensor signals can be transmitted to a signal processing unit 30 that is not illustrated in FIG. 1 and additionally processes or converts these sensor signals into image information.

Figure 2:
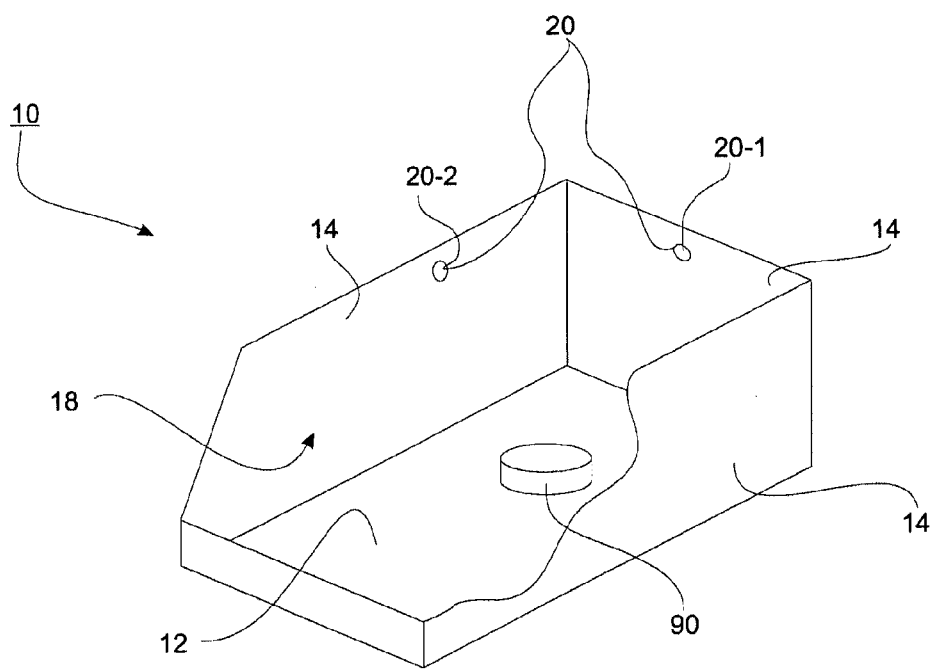
FIG. 2 shows an isometric representation of another embodiment of a container with a two-part detection device.

FIG. 2 shows another embodiment of a container 10. This container likewise features a bottom 12 and side walls 14 that jointly form the inner container wall 18. This container 10 is also illustrated in a cut-out fashion such that essentially the entire bottom 12 is visible. In this figure, only a single object 90 is likewise illustrated in the interior of the container 10 in order to provide a better overview.

The container 10 in the embodiment according to FIG. 2 features a detection device 20 that is divided into two parts and consists of a first detection device 20-1 and a second detection device 20-2. Both parts 20-1, 20-2 of the detection device 20 are situated in the side walls 14 of the container 10. However, they are spaced apart from one another such that they can monitor the inner wall 18 of the container 10 from different viewing angles, as well is in different viewing directions or different detecting directions, respectively. Due to the different viewing directions and viewing angles of the two parts 20-1, 20-2 of the detection device 20, three-dimensional correlations of the inner container wall 18 and of the relation between captured objects 90 and this inner container wall 18 can be analyzed based on the position of the parts 20-1, 20-2 of the detection device 20. If the position of the individual parts 20-1, 20-2 of the detection device 20 relative to one another is taken into consideration in the analysis, it is possible to generate three-dimensional image information and to obtain three-dimensional information on the actual filling status and/or occupancy status of the container 10 during the analysis.

In the embodiment according to FIG. 2, the detection device 20 may also perceive different light intensities from the interior of the container 10. Consequently, the reflection on the inner container wall 18 may also differ from corresponding reflections on object 90 within the container 10 in this case. The sensor signals of the multi-part detection device 20, i.e., of the two parts 20-1, 20-2 of the detection device 20, depend on the respectively detected light intensities and therefore reflect whether objects 90 lie at certain locations or in certain areas in the interior of the container 10 or the inner container wall 18 was detected at these locations or in these areas.

The differing sensor signals can be transmitted to a signal processing unit 30 that is not illustrated in FIG. 2 and processes these sensor signals into image information.

Figure 4A:
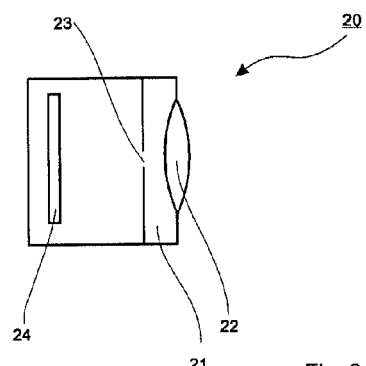
FIG. 4a shows a partial cross section through another embodiment of a container.
Figure 4B:
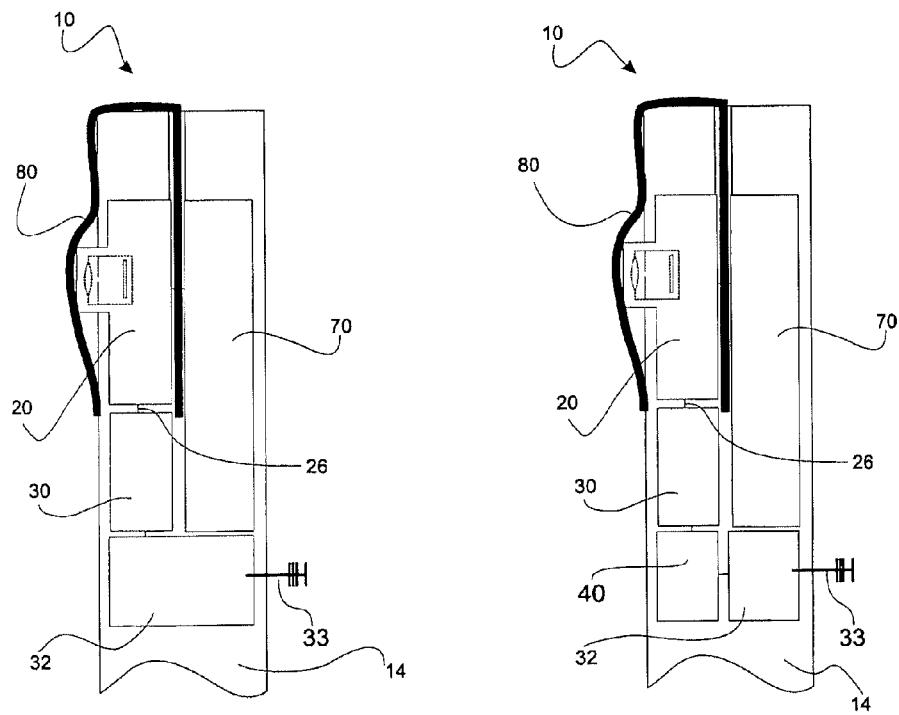
FIG. 4b shows a partial cross section through another embodiment of a container.

FIG. 3 schematically shows a detection device 20. FIGS. 4a and 4b respectively show a schematic representation of the functional design of a container module, in which at least one detection device 20 and one processing unit 30 are arranged. The difference between the embodiment according to FIG. 4a and the embodiment according to FIG. 4b can be seen in that the container module in FIG. 4b also contains an analyzing unit 40.

The detection device 20 according to FIG. 3 essentially features an optical system 21 and an optical sensor 24. In the embodiment shown, the optical system 21 consists of a lens 22 that is arranged in front of a diaphragm 23. An optical sensor 24 is arranged in the image plane of the optical system 21. The diaphragm 23 may also be arranged in front of the lens 22. The optical system 21 may consist of only one lens or—like a "camera obscura"—of only one pin diaphragm, but may also be realized in the form of more complex optics that comprise several lenses with or without diaphragm.

The optical sensor 24 is arranged in the image plane of the lens 22 in such a way that the sensor 24 can capture a sharp image of the segment or section of the container interior perceived by the detection device 20, i.e., of the inner container wall 18. The optical sensor 24 may consist of a simple electronic image sensor such as, e.g., a CCD sensor element or CMOS sensor element that can respectively perceive or detect different light intensities or simply different brightness stages with a low resolution, i.e., with a few pixels per unit of area. This means that the perception, i.e., the detection, is realized by generating different sensor signals that depend on the respectively perceived or detected light intensity. In other words, the sensor 24 can detect different light intensities, particularly different brightness values, in dependence on the location and generate sensor signals that are dependent on these light intensities. The optical sensor 24 may also be realized in a more complex fashion such as, for example, in the form of an optical system that is not only able to distinguish between different light intensities, but also between different tristimulus values.

The optical sensor 24 may furthermore consist of an imaging sensor, in which the signal processing unit 30 is already integrated in the sensor 24 or both elements are integrated into one component, respectively. The image information generated by such a combined detection device 20 and signal processing unit 30 can be directly transmitted in the form of, if applicable, chromatic image information, in the form of a still image or even in the form of a moving image. However, a moving image is only required for a container 10 under exceptional circumstances.

The sensor 24 has a specific resolution (pixels per unit of area). A still image with average resolution usually suffices for equipping a container 10 with the corresponding functionality that allows a more cost-efficient logistic process, i.e., cost-efficient monitoring of the filling status and/or the occupancy status of the container.

In order to improve the original data, the container 10, for example, according to FIG. 1 or FIG. 2 may be designed in such a way that the bottom 12 of the container 10 and the inner container wall 18 can be better distinguished from objects situated in the container 10.

For this purpose, it would be conceivable to entirely or partially provide the bottom 12 of the container and the inner container wall 18 with a UV-active material. For example, the container material may at least in the region of the inner container wall 18 consist of amorphous plastic that contains fluorescent dyes. Examples of such UV dyes are perylene (for blue, red and orange), naphthalimide (for purple and blue) or the like. For example, these dyes may be admixed to synthetic resin such that a UV-active layer can be produced on the inner container wall 18 in the form of a coating, for example, of Paraloid B-72 that is dissolved with ethyl acetate and contains admixed fluorescent dye; Paraloid B-72 is an acrylic ester polymer that makes it possible to produce water-white transparent coatings with excellent heat and chemical resistance.

The UV-active material absorbs UV radiation that, for example, can be purposefully emitted into the interior of the container, i.e., preferably toward the bottom 12 and the inner container wall 18, by one or more sources such as, e.g., UV-LEDs, preferably for a short time in the form of a UV light flash or permanently in a direct or indirect fashion, e.g., via mirrors. Subsequently, the UV-active material emits light in a defined wavelength range of the UV spectrum and/or visible spectrum that can be captured as an image in a locally resolved fashion by means of the detection device 20.

The surface areas of the bottom 12 and/or the inner container wall 18 that are shadowed by objects 90 situated in the container 10, as well as surfaces that are not provided with UV-active material, remain inactive in this case and therefore appear as dark areas on a captured image. This applies analogously to the contents in the form of the objects 90.

As already mentioned, it is furthermore possible to apply or integrate special geometries or patterns, for example, in the form of a grid, graduations, scales and/or filling level lines on/into the inner container wall 18 and/or the bottom 12 during the application of the UV-active coating.

Other interfering radiation from the surroundings in adjacent wavelength ranges can be suppressed by additionally providing at least one filter such as, e.g., a wavelength filter, a polarization filter or the like in the optical system 21 of the detection device 20. The UV sources, the detection device 20 and other optical components such as mirrors, lenses, filters, windows, optocouplers and the like may also be implemented in the form of electronic components and/or by means of software and thusly integrated into the container module.

For example, one or more high-resolution miniature camera(s) that is/are realized similar to cameras integrated into laptops or mobile telephones may be used for the detection device 20. Such a camera can be directly mounted on a printed circuit board and be equipped with a lens, aperture control, autofocus and/or special filters for optimizing the image quality under different ambient conditions, as well as for selecting special wavelength ranges. It would also be possible to realize a microprocessor-controlled aperture adjustment, by means of which the detection device 20 can be adapted to changing intensities of the incident electromagnetic radiation (light). One or more UV-LEDs may furthermore be provided on the same printed circuit board as the optical system 21 and likewise emit UV radiation into the interior of the container in a microprocessor-controlled fashion, preferably in the form of light flashes.

The detection device 20 preferably forms part of a protected container module that is integrated into the container 10, particularly into the container wall. In this case, the current-carrying or internally moving components preferably are completely protected against accidental contact, as well as the admission of water (e.g. IP66). For this purpose, the detection device may be arranged in the inner container wall 18, for example, behind a transparent protective window. In this case, all optical radiation passes through the transparent protective window on its way into the detection device 20 (light emitted or reflected by the bottom 12 or the inner container wall 18) or out of the detection device (UV radiation) in order to illuminate the interior of the container. Incident radiation can be projected on the optical system 21 and then on the sensor 24 by means of corresponding upstream filters.

In order to broaden the field of view, this may also be realized indirectly by means of a mirror of double-concave shape between the protective window and the optical system 22. In this way, the surface of the bottom 12, as well as of the inner container wall 18, including the contents can be optimally captured, i.e., with minimal blind zones in the corners of the container 10, directly underneath or to the right and to the left of the installation point of the detection device 20.

In addition to the optical system 21 and the optical sensor 24, the detection device may also feature an analog/digital (A/D) converter that converts the analog light signals detected by sensor pixels of the sensor 24, for example a camera semiconductor chip in the form of a CMOS sensor or CCD sensor, into digital signals. Consequently, the detection device 20 can transmit analog sensor signals to the processing unit 30 in the form of a digital sensor signal via a first interface 26 (see FIGS. 4a, 4b); alternatively, the processing unit 30 may also feature a corresponding A/D converter in its input.

An image signal of the interior of the container is generated from the sensor signals in the processing unit 30. This image information can be temporarily stored in the processing unit 30, namely in a corresponding memory such as, e.g., a Flash-RAM provided therein. This digital image information can subsequently be compacted, for example, into a conventional and, in particular, compressed format in an image processing means such as a signal processor of the processing unit 20 and then once again stored in the RAM such that it is available for the transmission to an analyzing unit.

Depending on its design, the analyzing unit 40 may also be integrated into the container module (see FIG. 4b and FIG. 6) or arranged remotely referred to the container module in the form of a central analyzing unit for several container modules (see FIG. 4a and FIG. 7); in the latter instance, the image information is preferably transmitted to the analyzing unit 40 in a wireless fashion.

Figure 6:
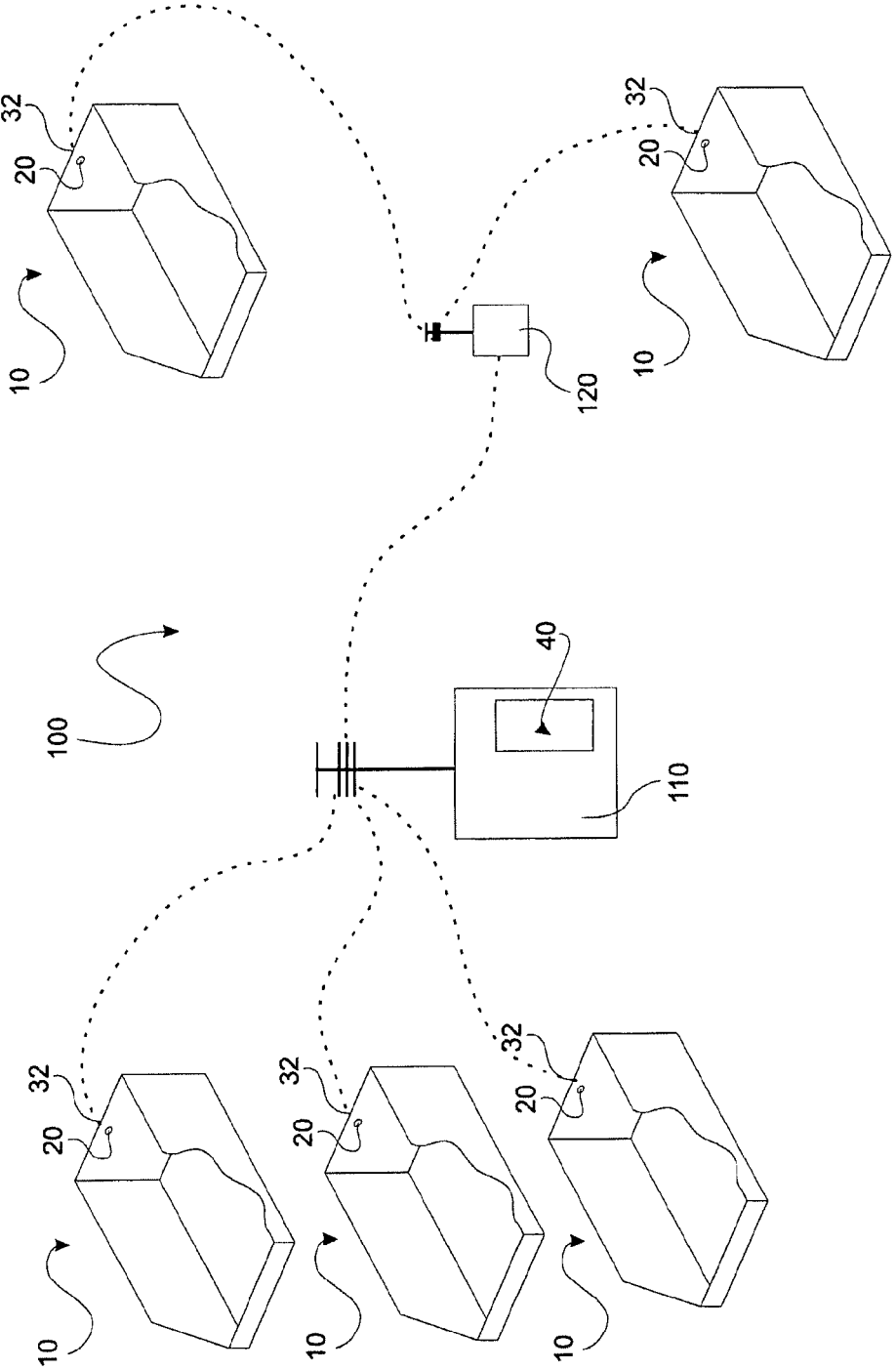
FIG. 6 shows a schematic representation of an embodiment of a monitoring system.

An intelligent container module therefore may contain the detection device 20 with additional A/D converter(s) and the processing unit 30 with random-access memory and program memory (RAM and ROM), a programmable control unit such as, e.g., a microprocessor for the sequential control of the various functions, a timer for coordinating the sequence timing, as well as for generating time stamps, a communication interface 32 with a transceiver and an antenna 33 for the wireless and, if applicable, bidirectional data transmission to a relay station or intermediate station or to a receiver of an analyzing unit 40 (see FIG. 6). The firmware and/or software implemented in the different digital components of the container module essentially comprise all module-specific control and processing functions.

The wireless transmission may conventionally take place bidirectionally via an antenna 33 or even an optical communication interface. The bidirectional data transmission also allows programming between the container module and, for example, a service module.

The power supply of the container module can be realized by means of an energy supply module 70, for example, with batteries for a mains-independent power supply. The batteries may be accommodated in a separate compartment, for example, on the lower end of the container module with the detection device 20. The compartment may be provided with a cover in order to protect the batteries from external access and environmental influences. In a distribution center, for example, the batteries can be easily replaced with new batteries, if so required (e.g. when they are depleted).

FIGS. 4a and 4b respectively show a partial cross section through a side wall 14 of an embodiment of a container 10. The side wall 14 of the container 10 is equipped with a container module that therefore is permanently integrated into the side wall 14. The respective detection device 20 of the container module is connected to a signal processing unit 30 via an interface 26.

In the embodiment according to FIG. 4a, the signal processing unit 30 is connected to an analyzing unit 40 that is not illustrated in greater detail via a communication interface 32 that in this embodiment is realized in the form of an air interface such as, for example, a WLAN or Bluetooth connection in order to supply this analyzing unit with the captured image information. Light intensities detected by the detection device 20 are converted into sensor signals and further processed into image information by the signal processing unit 30. The image information is then wirelessly transmitted to the analyzing unit 40 that is not illustrated in greater detail in FIG. 4a via the communication interface 32 and can be analyzed in this analyzing unit in order to determine information on the filling level or the occupancy status.

Furthermore, a power supply module 70 is provided for the energy supply of the container modules according to FIGS. 4a and 4b in order to supply all components of the respective container module with power. This power supply module 70 may be realized, for example, in the form of a capacitor, but also in the form of one or more batteries. It would also be conceivable to use other autarkic power supplies such as, for example, small solar modules as power supply modules 70.

Furthermore, a tamper-evident device 80 may be provided that interrupts the power supply 70 of the detection device 20 and/or the signal processing unit 30 and/or the communication interface 32 in the delivery state of the container 20. The power supply of the power supply module 70 is only released once the tamper-evident device 80 has been removed.

In the simplest instance, the tamper-evident device 80 may consist of an adhesive strip that preferably also covers and therefore protects the lens of the detection device 20 in the delivery state. In order to activate the detection device 20, the adhesive strip is removed and subsequently pulled out of the interior of the side wall 14. The removal from the side wall 14 makes it possible to contact two contact elements between the power supply module 70 and the detection device 20 and/or the signal processing unit 30 and/or the interface 32 and therefore to activate the detection device 20.

FIG. 4b essentially shows the same embodiment as FIG. 4a, but an analyzing unit 40 is also integrated into the container module in the embodiment according to FIG. 5b. This embodiment represents a completely decentralized solution for the determination of information on the filling status or occupancy status of the container 10 such that the image information generated by the signal processing unit 30 is in this case transmitted to the analyzing unit 40 and the analysis takes place directly on the container 10. The results of the analysis can then be forwarded by the analyzing unit 40 via the communication interface 32 and the antenna 33. Due to this measure, only the determined filling level value and/or occupancy status needs to be transmitted via the communication interface in the form of an air interface of the type illustrated in the form of an antenna in FIG. 4b.

The image information generated by the signal processing unit 30 usually comprises significantly larger data quantities than the filling statuses or occupancy statuses. In particularly simple instances, the filling status is an individual filling status value that correlates with corresponding filling statuses. For example, a digital data correlation would be conceivable, wherein 0 corresponds to an empty container and 1 corresponds to a full container and no other filling level status values exist in between. In such an instance, it is therefore only required to transmit a single digital value, i.e., a single bit, while the entire image information that in dependence on the resolution may sometimes comprise significant data quantities would otherwise have to be transmitted.

Figure 5:
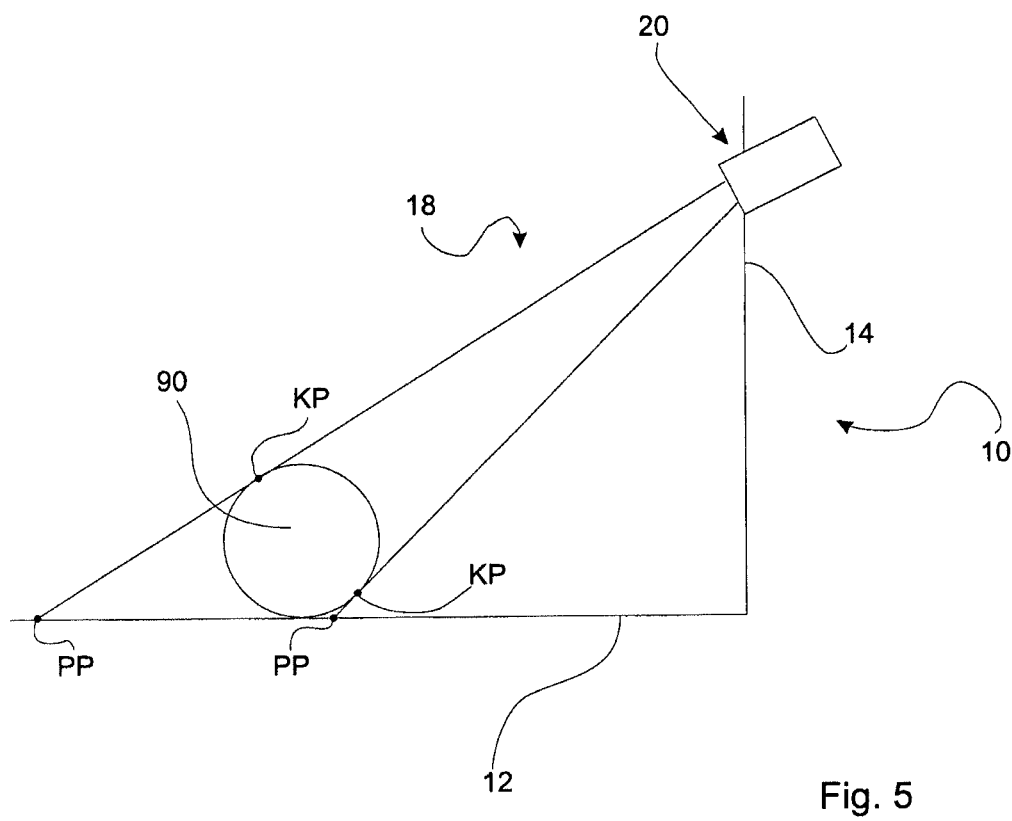
FIG. 5 shows a schematic cross-sectional representation of the detection of contour points.

FIG. 5 schematically shows the function of an embodiment of a detection device 20, as well as the analysis of the intensities detected by this detection device. In this case, the detection device 20 is equipped with a camera and captures at least a section of the inner wall 18 of the container 10 with this camera. An object 90 of circular cross section is arranged in the interior of the container 10. The camera of the detection device 20 detects reflected light beams. In other words, light incident into the interior of the container 10 is reflected by the inner container wall 18 and by the bottom 12 that is not covered by the object 90 or the incident light activates a UV-active coating of the bottom 12 and the inner container wall 18 such that the activated surfaces accordingly emit UV light.

As an example, two light beams that are reflected by the bottom 12 in the direction of the detection device 20 are illustrated in greater detail in FIG. 5. The points, at which the light beams are reflected on the container bottom 12, i.e., on the entire inner container wall 18, therefore are projection points PP of the contour of the object 90 viewed from the detection device 20. These projection points PP correspond to the points of the contour of the object 90 that are projected on the bottom 12 and detected by the detection device 20.

A closer inspection of the left projection point of the two projection points PP illustrated in FIG. 5 indicates that this is an extreme point, to both sides of which the light intensities, i.e., the reflection characteristics, differ from its own light intensity. All points situated to the left of the left projection point PP are perceived as reflection of the bottom 12 by the detection device 20 due to their light intensity. All points situated to the right of the left projection point PP and to the left of the right projection point PP, i.e., between these two projection points, are perceived as reflection of the object 90 by the detection device 20 due to their light intensity. The perception of the detection device 20 is expressed in the form of corresponding specific sensor signals generated by the detection device 20 in this case. All points situated to the right of the right projection point PP are once again perceived as reflection of the bottom 12 by the detection device 20. The points of the bottom 12 that lie between the two projection points PP cannot be perceived by the detection device 20 because they are covered by the object 90 due to the viewing angle of the detection device 20 and the position of the object 90. The reflection lines from the two projection points PP to the detection device 20 are tangent to the outline of the object 90 along these reflection lines. Particularly this outline is perceived as the contour of the object 90 by the detection device 20 and therefore referred to as contour points KP. In the region between the two projection points PP, reflections of the object 90 are therefore perceived with light intensities, i.e., particularly tristimulus values and/or brightness values, that can be assigned to the object 90, particularly in contrast to the bottom 12 or to the inner container wall 18.

According to the schematic illustration in FIG. 5, a detection device 20 therefore can convert the received light intensities into sensor signals based on different light intensities such as, for example, different tristimulus values and/or brightness values. The sensor signals are converted into image data in the signal processing unit 30. The image data can be correspondingly interpreted, i.e., analyzed, in an analyzing unit 40. The analyzing unit is not illustrated in FIG. 4 and interprets or processes the image information generated from the sensor signals of the detection device 20 by means of the signal processing unit 30 based on information on the reflection characteristics of the object 9 and of the bottom 12.

As an alternative to the above-described UV-active coating of the bottom 12 and the inner container wall 18, the bottom 12 and/or the inner container wall 18 may also be realized much duller and essentially reflect hardly any or only little light. In this case, the light intensity, i.e., the brightness values, detected by the detection device 20 to the right of the right projection point PP and to the left of the left projection point PP and converted into sensor signals therefore correspond to image information that is processed by the signal processing unit 30 and equated with low brightness values in the analyzing unit. Points perceived by the detection device 20 between the two projection points PP receive light reflected by the object 90. In comparison with the dull bottom 12, this reflected light has a much higher intensity such that a greater brightness can be determined by the analyzing unit 40 for points between the two projection points PP and therefore also between the two contour points KP during the analysis of the corresponding sensor signals. Information on the filling status of the container is obtained by carrying out a comparison between the areas with high light intensity, e.g. significant brightness, and the areas with low light intensity, e.g., in the bottom 12.

Due to the determination of the contour points KP in dependence on the positioning of the detection device 20, it is furthermore possible to generate a contour line that is based on a connection of all determined contour points KP. Contours of the objects 90 can be determined based on the contour line and compared with stored contours in the analyzing unit such that information on the type of occupancy, particularly the type of object 90, can be obtained in this way.

FIG. 6 schematically shows an example of a monitoring system 100. In this case, individual containers 10 of the type explicitly described above with reference to preceding FIGS. 1 and 2 are provided. A container module of the type described with reference to FIG. 4a is arranged in each of the containers 10. Wireless communication links such as, e.g., radio links via the second interface, namely the communication interface 32 with a central element of the monitoring system 100, particularly a receiver 110, are illustrated with broken lines.

The receiver 110—that is centrally arranged in the system—may feature the analyzing unit 40 that in such an embodiment can also carry out tasks that are much more complex than the tasks that can be carried out in a container module with limited energy budget that is integrated into the container 10. Consequently, such a central analyzing unit 40 not only can carry out the analysis for each of the containers 10, but also draw a correlation from the analysis results and set in motion a logistic process such as, for example, the reordering of components of individual containers 10.

In applications, in which the monitoring system 100 extends over large distances, i.e., in large high-bay storage systems, or in which the container 10 needs to be transported over long distances, it is possible to provide an intermediate station 120 in the form of a repeater or a relay station that in the form of a concentrator collects the data received from remote containers 10 and transmits the collected data to the receiver 110 with the analyzing unit 40. Consequently, the size of the monitoring system 100 is not subject to any limitations. In this case, the connection between the intermediate station 120 and the receiver 110 may be realized with additional connecting means, particularly also wire-bound connecting means.

Figure 7:
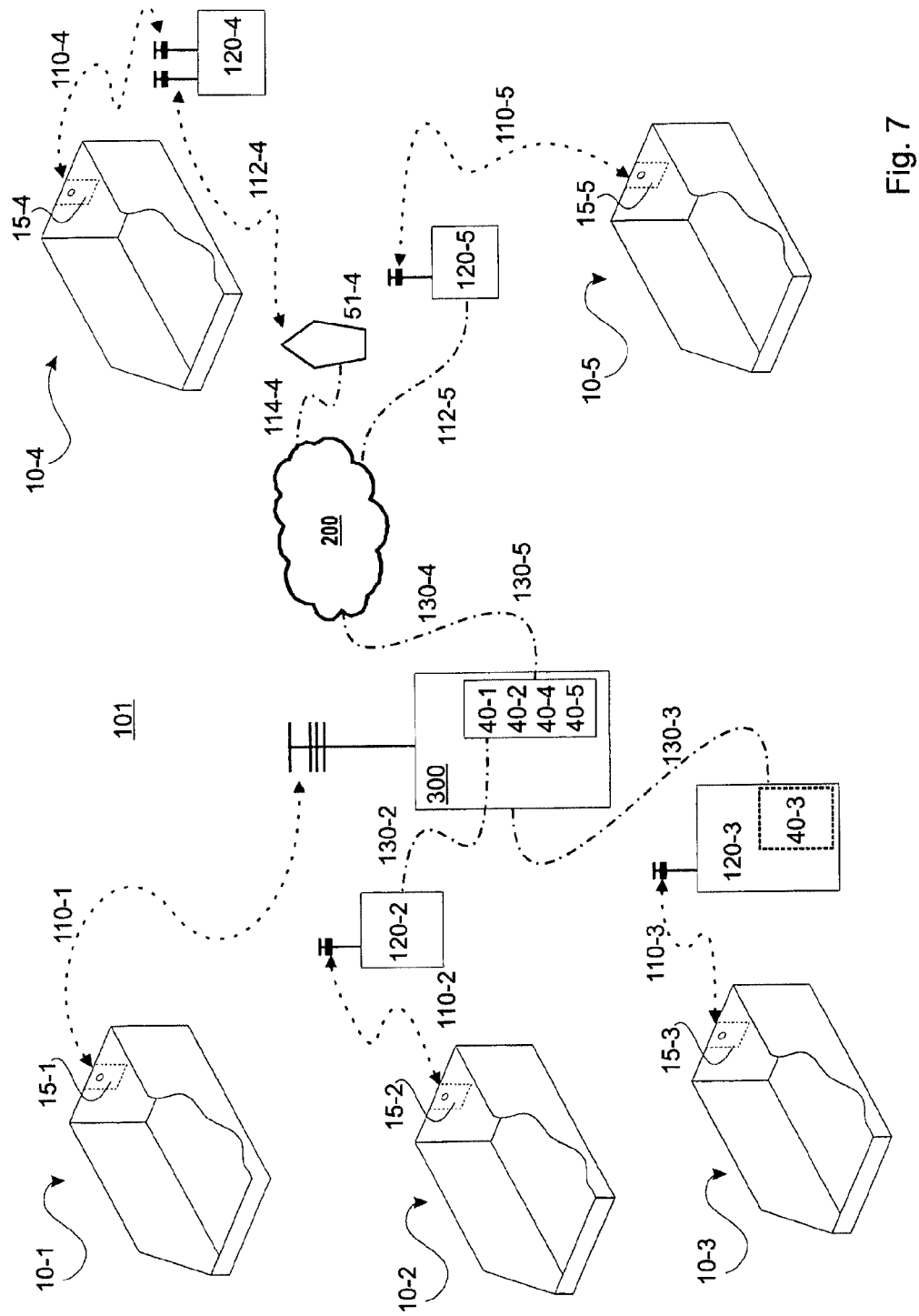
FIG. 7 shows a schematic representation of an embodiment of a monitoring system for dynamically monitoring filling levels of containers.

FIG. 7 schematically shows another example of a monitoring system 110 that forms part, for example, of an inventory control system or warehousing system. The system comprises containers 10-1, 10-2, 10-3, 10-4 and 10-5 of the type explicitly described above. Communication links between the individual containers 10-1, 10-2, 10-3, 10-4 and 10-5 and elements of the system 101 are indicated with broken lines. In the system description, it should only be of minor importance exactly how the data communication is realized and operates—this basically is sufficiently known. Consequently, only the communication required for determining the filling levels of the individual containers in order to realize the dynamic filling level monitoring of the containers of the system 100 is described below. In this context, one aspect is the new capabilities of an inventory management system made possible by the containers proposed herein, as well as the respectively integrated function for determining information on the respective container. This information is available for a central analysis or an analysis carried out remotely with respect to the container, respectively, and therefore makes it possible to quasi monitor the filling status, as well as the occupancy status, of each container in the system in real time.

Each of the containers 10-1, 10-2, 10-3, 10-4 and 10-5 features a container module 15-1, 15-2, 15-3, 15-4 and 15-5 that respectively contains a detection device 20 and signal processing unit 30 of the type described above with reference to FIGS. 1 to 4.

The container module 15-1 of the container 10-1 is directly connected to a central computer 300 via a wireless radio link 100-1. In this case, an analyzing unit 40-1 forms part of the central computer 300, on which an inventory control system (WWS) such as, for example, SAP or the like is installed. The analyzing unit 40-1 may be implemented in the form of a software routine of the WWS.

Every time the container module 15-1 of the container 10-1 detects intensities from the interior of the container 10-1—this may occur during the initialization of the container 10-1 prior to each filling process or during the period of depletion—the container module 15-1 transmits the detected intensity information to the analyzing unit 40-1 in the central computer 300 in the form of processed image data. The analysis of this image data is then carried out in the analyzing unit in order to determine information on the filling level or occupancy status of the container 10-1.

The configuration described in connection with the container 10-1 is sensible, for example, for a small business such as, e.g., an automobile repair shop with a directly attached storage area or workshop area, in which containers 10-1 to be monitored are located. In this case, the system provides maximum flexibility with a minimal expenditure for the communication infrastructure.

In larger businesses or storage systems, a direct radio link between the container and a computer of the WWS may not be sensible, for example, because the individual containers 10-2 are distributed over such a large area that the communication with a central computer could not be realized with justifiable effort, for example, due to shading of the radio waves, or the individual central computer would be overwhelmed by the communication with an excessive number of containers.

A first radio link 110-2 therefore connects, for example, the container 10-2 to a radio access point 120-2 that in turn is connected to the central computer 300 of the WWS and therefore to the analyzing unit 40-2 implemented therein via a wire-bound communication link 130-2.

In order to relieve the central computer 300 from the tasks of the analyzing unit 40-1 or 40-2, for example, when a very large number of containers 10-3 needs to be monitored, the analyzing unit 40-3 is arranged directly at the radio access point 120-3 for the container 10-3. In this case, the radio access point 120-3 may consist of a computer with a corresponding air interface, in which the analyzing unit 40-3 is also implemented in the form of a software program. Alternatively, a remote computer that fulfills the function of the analyzing unit 40-3 could also be connected to the radio access point 120-3. The information on the filling status and/or occupancy status of the container 10-3 generated by the analyzing unit 40-3 is forwarded to the central computer 300 and therefore to the WWS installed thereon, for example, via a wire-bound communication link 130-3.

Another option is described with reference to the container 10-4 that, for example, consists of a mobile container or is located on a transport vehicle such as, e.g., a truck, train, aircraft or ship. In this case, the container module 15-4 of the container 10-4 is connected to a radio access point 120-4 that is arranged on the mobile container or in the transport vehicle within radio range via an air interface 100-4. The radio access point 120-4 in this case ideally communicates via an air interface 112-4 with a radio access point to a public or private or virtual private (VPN) data network 200 such as, for example, the Internet. In this way, a data link with the analyzing unit 40-3 in the central computer 300 is established via the data network 200. For this purpose, the central computer itself is conventionally connected to the data network 200, for example, via a wire-bound communication interface 130-4. This enables the WWS to also monitor the filling statuses of mobile containers 10-4 dynamically.

Furthermore, a stationary storage site situated remotely with respect to the central computer 300 can also be connected via a public or private or virtual private (VPN) data network 200 such as, for example, the Internet.

For this purpose, the radio access point 120-5 is connected, for example, in a wire-bound fashion to the data network 200 by means of a communication interface 112-5, wherein the central computer 300 with the analyzing unit 40-5 is once again connected to said data network by means of a wire-bound communication interface 130-5. The container module 15-5 of the container 10-5 can transmit the intensity information detected in the interior of the container 10-5 to the analyzing unit 40-5 via the radio access point 120-5.

Individual configuration characteristics of all communication paths described in connection with the containers 10-1 to 10-5 naturally can also be combined. For example, the respective analyzing unit 40-1 to 40-5 basically could also be directly integrated into the container modules 15-1 to 15-5 of the respective container 10-1 to 10-5 in all embodiments. An arrangement of the analyzing unit at any point along the communication path between the respective container 10-1 to 10-5 and the central computer 300 of the WWS would basically also be conceivable in all embodiments. For example, the analyzing unit may also be implemented in the form of an application on a virtual server in a data network 200 such as, for example, the Internet, wherein this is also possible for the entire software environment of the WWS.

As already mentioned, any communication interfaces and communication types used do not have to be described in greater detail because they may be arbitrarily selected by a person skilled in the art within the scope of the solutions presented herein. With respect to the radio link of the detection device, "wireless" LAN (WLAN), Bluetooth, Zig-Bee and the like are merely mentioned as examples of potential radio links.

Figure 8B:
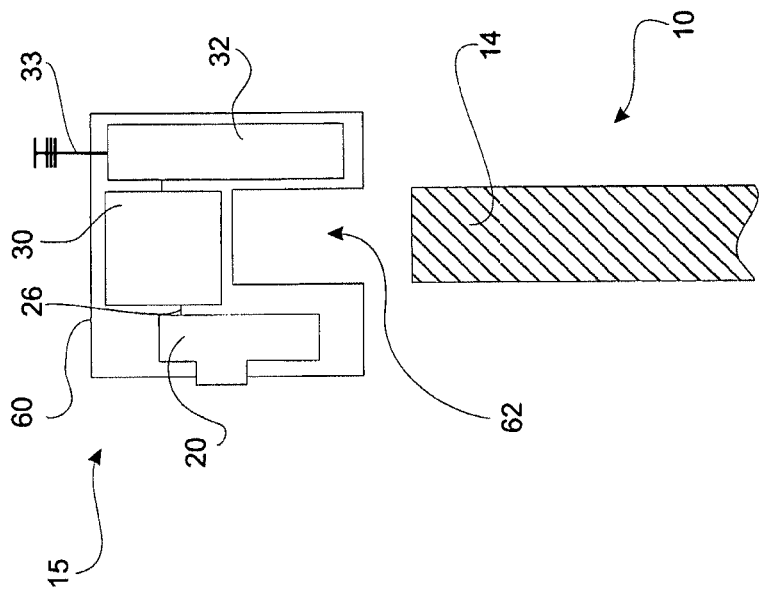
FIG. 8b shows the embodiment according to FIG. 7a, in which the housing for the detection device is separated from the side wall.
Figure 8A:
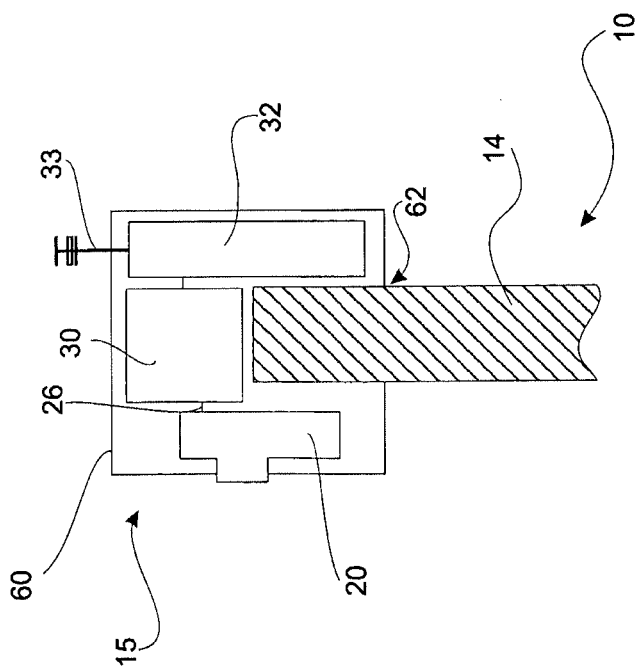
FIG. 8a shows another embodiment of a container.

FIGS. 8a and 8b show an option for retrofitting an already existing container 10 into a container 10. In this case, the detection device 20, the signal processing unit 30 and the second interface 32 (communication interface) are realized in the form of a container module 15 in a housing 60 that features a mechanical interface 62 with the container 10, particularly the side wall 14. An antenna 33 is also indicated on the housing 60 in this case in order to realize the communication with a receiving station 120 via a radio link 110 in a monitoring system 100, for example, of the type illustrated in FIG. 6.

FIG. 8a shows the installed state while FIG. 8b shows the separated state of the housing 60. These figures indicate that the container module 15 with its housing 60 is modularly equipped with the functionality of the detection device 20, the signal processing unit 30 and the second interface 32 and can be connected to the container 10 via a mechanical interface 62.

The mechanical interface 62 in the example embodiment according to FIGS. 8a and 8b is realized in the form of a slot that with respect to its dimensions corresponds to the material thickness of the side wall 14 of the container 10. In other words, the housing 60 of the container module 15 according to FIGS. 8a and 8b is simply attached to the side wall 14 of the container 10. In the attached state, the container module 15 is positioned as illustrated in FIG. 8a. In this way, a container 10 according to FIG. 8a is retrofitted into the container 10 without requiring any structural modifications of the container 10.

According to an embodiment that is not illustrated in the figures, it would alternatively also be possible to integrate the container module into the housing wall. This alternative is suitable, for example, for containers that have a sufficient wall thickness and already feature cavities for stability reasons. A correspondingly shaped container module can also be installed into such cavities.

The described example embodiments should merely be interpreted as examples that serve for elucidating the invention. If technically feasible, it is also possible to combine the individual described embodiments within the scope of the objects defined in the attached claims.

We claim:

1. A container for the transport and/or the storage of piece goods and/or bulk materials objects, the container comprising:
   a bottom and a side wall encircling the bottom so that the bottom and the side wall define an inner wall of the container for receiving the objects, wherein the interior of the cross-section of the side wall are integrated;
   a detection device with an optical system and an integrated optical sensor, wherein the detection device is designed for generating sensor signals in accordance with intensities of electromagnetic radiation, particularly light intensities, in the interior of the container; and
   an interface that is functionally connected to the detection device and serves for transmitting the sensor signals to a signal processing unit with a function for generating image information based on the sensor signals in order to determine information on an occupancy status and/or filling status of the container;
      wherein the container is a moveable container, and wherein the bottom and the side wall forming the inner container wall are adapted to the detection device in such a way that tristimulus values and/or brightness values detected by the detection device for the inner container wall and tristimulus values and/or brightness values detected by the detection device for objects differ by a predefined detection threshold value.

2. The container according to claim 1, wherein the detection device is equipped with at least one camera with an optical system that features a single pin diaphragm or at least one lens in front of or behind a diaphragm or at least one lens, wherein the optical sensor is arranged in the image plane of the optical system.

3. The container according to claim 1, wherein the container further comprises the signal processing unit that is connected to the detection device and designed for converting the sensor signals generated by the optical sensor into image information as well as a second interface for transmitting the image information to an analyzing unit that is designed for determining the occupancy status and/or filling status of the container.

4. The container according to claim 3, wherein the analyzing unit is arranged on the container adjacent to the detection device and/or the signal processing unit, and is functionally connected to the second interface in a wire-bound fashion.

5. The container according to claim 3, wherein the analyzing unit is arranged separately of the container and is functionally connected to the second interface at least sectionally in a wireless fashion or by means of a radio link.

6. The container according to claim 3, wherein the analyzing unit is configured to determine:
   image points in the form of projection points of contour points of objects situated in the container during the analysis of the image information;
   at least one contour line that lies on the determined contour points; and
   information on the occupancy status and/or filling status of the container from the at least one contour line.

7. The container according to claim 1, wherein the optical system further comprises at least one filter that is configured such that the detection device can only detect electromagnetic radiation from a frequency range defined such that locations or areas of the bottom and/or of the inner container wall with predetermined tristimulus values and/or brightness values are detected for the analyzing unit, and wherein the analyzing unit comprises a function that is configured to determine information on the occupancy status and/or filling status of the container based on the detected locations or areas.

8. The container according to claim 1, wherein the container comprises:
   a power supply module that is connected to the detection device via an electric supply line; and
   an activation device that is functionally connected to the power supply module and/or to the analyzing unit and is configured to activate the power supply module and the analyzing unit for a detection and analysis period.

* * * * *